(12) United States Patent
Bruce et al.

(10) Patent No.: US 7,121,727 B2
(45) Date of Patent: Oct. 17, 2006

(54) INLET GUIDE VANE BUSHING HAVING EXTENDED LIFE EXPECTANCY

(75) Inventors: Robert William Bruce, Loveland, OH (US); Timothy David Distler, Batavia, OH (US)

(73) Assignee: General Electric Company, Schenectady, NY (US)

(*) Notice: Subject to any disclaimer, the term of this patent is extended or adjusted under 35 U.S.C. 154(b) by 45 days.

(21) Appl. No.: 10/939,813

(22) Filed: Sep. 13, 2004

(65) Prior Publication Data
US 2005/0031238 A1    Feb. 10, 2005

Related U.S. Application Data

(63) Continuation-in-part of application No. 10/329,092, filed on Dec. 24, 2002, now abandoned.

(51) Int. Cl.
*F16C 33/20* (2006.01)

(52) U.S. Cl. ........................ 384/297; 384/911

(58) Field of Classification Search ............. 384/297, 384/298, 299, 300, 913, 911
See application file for complete search history.

(56) References Cited

U.S. PATENT DOCUMENTS

| | | | |
|---|---|---|---|
| 3,887,297 A | 6/1975 | Welchek | |
| 3,990,810 A | 11/1976 | Amos et al. | |
| 3,994,814 A | 11/1976 | Cairns | |
| 4,376,710 A | 3/1983 | Gardos et al. | |
| 4,397,910 A | 8/1983 | Benson et al. | |
| 4,834,613 A | 5/1989 | Hansen et al. | |
| 4,892,552 A | 1/1990 | Ainsworth et al. | |
| 5,190,439 A | 3/1993 | Das | |
| 5,249,934 A | 10/1993 | Merritt et al. | |
| 5,338,806 A | 8/1994 | Pater | |
| 5,403,666 A | 4/1995 | Lubowitz et al. | |
| 5,664,890 A | 9/1997 | Nowak et al. | |
| 5,688,848 A | 11/1997 | Cella et al. | |
| 5,893,518 A | 4/1999 | Bruchez, Jr. et al. | |
| 5,896,736 A | 4/1999 | Rajamani | |
| 6,045,325 A | 4/2000 | Horvath et al. | |
| 6,170,990 B1 | 1/2001 | Hawkins | |
| 6,184,333 B1 | 2/2001 | Gray | |
| 6,209,198 B1 | 4/2001 | Lammas et al. | |

*Primary Examiner*—Lenard A. Footland
(74) *Attorney, Agent, or Firm*—McNees Wallace & Nurick LLC

(57) ABSTRACT

The present invention is a bushing for use in a gas turbine engine. The bushing is suitable for use in a gas turbine engine. The thickness of the bushing is increased to about 0.050 inches and the life expectancy of the bushing is at least doubled.

20 Claims, 2 Drawing Sheets

INLET GUIDE VANE BUSHING HAVING EXTENDED LIFE EXPECTANCY

CROSS-REFERENCE TO RELATED APPLICATIONS

This Application is a continuation-in-part of Application Ser. No. 10/329,092, filed Dec.24, 2002, now abandoned.

GOVERNMENT RIGHTS

The United States Government may have certain rights in this invention pursuant to Government Contract No. F-33657-99-D-2050.

FIELD OF THE INVENTION

The present invention is directed to an improved inlet guide vane bushing for use on a high performance engine.

BACKGROUND OF THE INVENTION

A basic gas turbine engine for an aircraft includes a compressor that compresses air entering the engine, a combustor section where the compressed air is mixed with fuel and combusted as a hot gas, a turbine where energy is extracted from the hot gaseous stream to turn the engine shaft on which the compressor is mounted and an exhaust where the remaining hot gaseous stream is used to propel the aircraft. Turbine engines used to propel large aircraft such as passenger aircraft and transport aircraft may include a fan mounted on the shaft in front of the compressor, which may direct some of the air around the compressor. Turbine engines used to propel military aircraft may include augmenters or afterburners in the exhaust to inject and burn additional fuel into the exhaust gas stream for additional thrust. Typically, advanced turbine engines used in high performance military aircraft include variable inlet guide vanes, although there is nothing to preclude their use on commercial aircraft or low performance military aircraft.

The variable inlet guide vanes are assemblies that allow for realignment of vanes due to changing air angles that occur as the operating condition of the compressor or fan changes so that the air can be passed through the engine in the most efficient manner. The inlet guide vane assemblies are located radially in the engine and in the air flow path and can pivot about an axis substantially perpendicular to the flow of air through the engine by about 45°. They are moved in response to power requirements so as to control capacity of the compressor and hence the power generated by the engine. These vanes also direct the flow of air in the most efficient manner through the compressor. In addition, the movement of the inlet guide vanes can be used to avoid surge and stall that can occur in the engine. Because of the frequently changing power demands as determined by the pilot, the inlet guide vane assemblies are constantly moving in response to changing power demands.

The frequent movement of the inlet guide vane assemblies in response to pilot requirements for power and due to engine vibrations results in considerable wear to the inlet guide vane assemblies, which are designed to accommodate wear. The inlet guides are mounted in bearings that typically include bushings, which are designed to minimize wear between the vane and the bushing, and the bushing and the engine casing and shroud. The bushings also act to seal the leak path that otherwise exists between the case and the vane. The variable vane includes a vane stem that extends through the opening in the engine casing (hereinafter referred to as the "outer end") and through the bushing and a washer. The bushing and washer are referred to herein as a bearing assembly, the bearing assembly positioned radially outboard referred to as the first bearing assembly. The vane also includes a similar second bearing assembly at its inner radial end. The bearing assembly produces a low friction surface that prevents metal on metal contact. Typically, better wear performance is achieved by polymeric bushings that are made from thin material, thinner materials yielding longer life.

A lever arm is fixedly joined to the vane stem extending outwardly from the vane bushing or first bearing assembly. The distal end of the lever arm is operatively joined to an actuation ring that controls the angle of the vane. All of the van lever arms in a single stage are joined to a common actuation ring for ensuring that all of the variable vanes are positioned at the same angular orientation relative to the airflow in the compressor stage.

Currently, bushings are made from a high-temperature composite material comprising carbon fiber reinforcing rods and a polyimide resin matrix. The high-temperature composite material may also additionally comprise filler material. The bushings are commonly known as VESPEL® CP™ bushings. Both VESPEL® and CP™ are trademarks that are owned by E.I. Du Pont De Nemours and Company of Wilmington, Del. The polyimide resin is commonly known as NR150™. The NR150™ trademark is owned by Cytec Technology Corp. of Wilmington, Del. For a gas turbine engine used in military aircraft, the bushings have a thickness of about 0.025 inches (25 mils). As is typical, the bushings have a limited wear life before requiring replacement, and it is always desirable to increase the wear life of the bushings to increase the mean time between replacement or repair.

SUMMARY OF THE INVENTION

The present invention provides a bushing for use in a gas turbine engine which has improved wear characteristics. The bushing is manufactured from a high temperature composite material comprising carbon fiber reinforcing rods and a polyimide resin matrix. The bushing may also additionally comprise filler material. The bushings are commonly known as VESPEL® CP™ bushings. The bushing thickness has been increased from about 0.025 inches (25 mils) to about 0.055 inches (55 mils). The bushing thickness is generally in the range of about 0.045 inches to about 0.055 inches.

An advantage of the present invention is that the wear life of the bushing is improved by over 100%, which means that the mean time between replacement for the bushing has been doubled so that maintenance related to bushing wear in variable inlet guide vanes can be reduced, resulting in decreased maintenance costs.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention provides a bushing for use in an inlet guide vane assembly for a gas turbine engine. The bushing of the present invention has a preferred thickness of about 0.050 inches (50 mils). The manufacturing tolerance of such a bushing typically is ±0.002 inches. The bushing is manufactured from a high temperature composite material comprising carbon fiber reinforcing rods and a polymeric matrix. The polymeric matrix is preferably a polyimide resin matrix. The bushing may also additionally comprise filler material.

Figure 1:
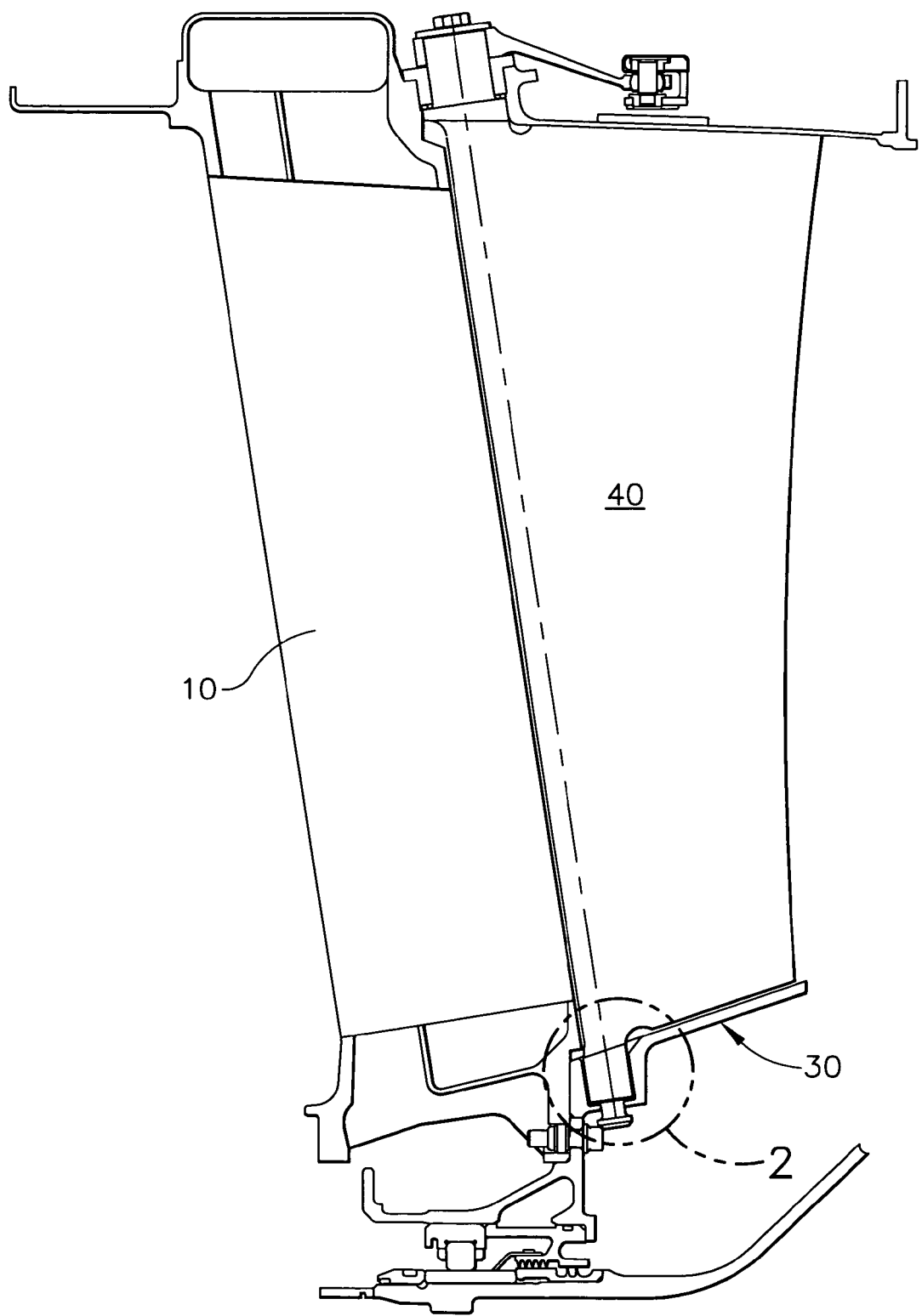
FIG. 1 is a sectional view of an inlet guide inner bearing support, showing the location of bushings of the present invention.
Figure 2:
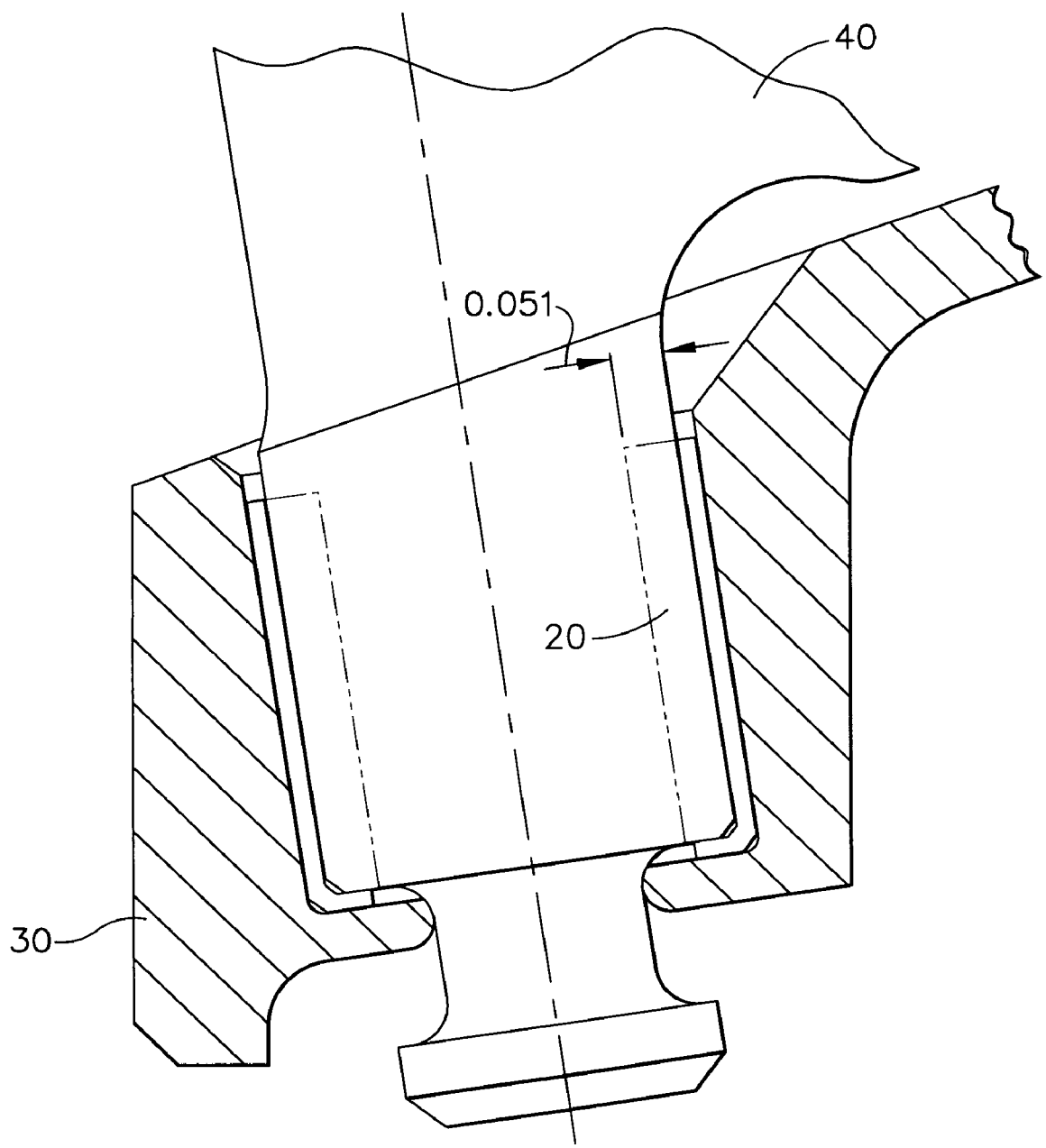
FIG. 2 is an enlarged view of a bushing assembled in the inner bearing support.

Referring now to FIG. 1 which is a typical inlet guide vane assembly 10 as may be found in a gas turbine engine. The bushing 20 extends between the shroud 30 and the vane 40. Surprisingly, and contrary to the well-established theories and teachings in the art, increasing the thickness of the bushing has actually improved the life of the bushing in this application.

Existing bushings having a thickness of 0.025 inches were tested in a fixture in which the bushings were installed in an inlet guide vane assembly and the assembly repeatedly was cycled through the full range of rotation. A thirty-five pound load was applied to the bushing to simulate an eccentric load and increase wear. The bushings experience severe wear after about 90,000 cycles.

Improved bushings of the present invention having a thickness of about 0.050 inches were tested in a fixture in which the bushings were installed in an inlet guide assembly and the assembly repeatedly was cycled through the full range of rotation. A thirty-five pound load was initially applied to the bushing to simulate an eccentric load and increase wear. As the test progressed, the overhung load was gradually increased to 100 pounds. The base load was thirty-five pounds. After about 90,000 cycles, the load was increased by ten pounds. The load was increased by an additional ten pounds about every 20,000 cycles until the final load of 100 pounds was reached. After about 200,000 cycles, the bushings were removed and examined. Even with increased load, the bushings exhibited minimal wear. The actual improvement can only be determined from in-flight usage which will take several years to determine. However, based on these laboratory test results, the new bushings are expected to provide a service life expectancy four times longer than the life expectancy of current bushings.

Surprisingly, not only did the bushing survive the testing, the bushing unexpectedly performed better than the bushing of lesser thickness. Based on the testing results, the bushing having a thickness of about 0.050" (50 mils) are expected to have a life expectancy of at least twice that of existing bushings having a thickness of about 0.025".

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A bushing for use in a variable inlet guide vane for a gas turbine engine, comprising:
   carbon fiber reinforcing rods and a polymeric matrix, wherein the bushing has a thickness of about 0.045 inches to about 0.055 inches, wherein the bushing has a life expectancy of more than about 200,000 cycles.

2. The bushing of claim 1, wherein the polymeric matrix is a polyimide resin matrix.

3. The bushing of claim 2 wherein the bushing has a life expectancy of over 200,000 cycles in a test fixture with an overhung load of 100 pounds.

4. The bushing of claim 1, wherein the bushing life expectancy is over two times the life expectancy of a bushing comprising fiber reinforcing rods and a polyimide resin matrix having a thickness of about 0.025 inches.

5. The bushing of claim 1, wherein the bushing life expectancy is at least three times the life expectancy of a bushing comprising fiber reinforcing rods and a polyimide resin matrix having a thickness of about 0.025 inches.

6. The bushing of claim 1, wherein the bushing life expectancy is at least four times the life expectancy of a bushing comprising fiber reinforcing rods and a polyimide resin matrix having a thickness of about 0.025 inches.

7. The bushing of claim 1, wherein the bushing is disposed between a case and a vane of a gas turbine engine.

8. The bushing of claim 1, wherein the bushing has a life expectancy of more than about 200,000 cycles in a test fixture with an overhung load of about 35 pounds for about 90,000 cycles, the overhung load being increased by about 10 pounds for each additional 20,000 cycle increment until the overhung load is about 100 pounds.

9. A bushing for use in a variable inlet guide vane for a gas turbine engine, the bushing comprising:
   a composite material comprising carbon fiber reinforcing rods and a polyimide resin matrix, wherein the composite material has a thickness in the range of about 0.045 inches to about 0.055 inches, wherein the bushing has a life expectancy of more than about 200,000 cycles.

10. The bushing of claim 9, wherein the bushing thickness is in the range of about 0.048 inches to about 0.052 inches.

11. The bushing of claim 10, wherein the bushing has a thickness of about 0.050 inches.

12. The bushing of claim 9 wherein the bushing has a life expectancy of over 200,000 cycles in a test fixture with an overhung load of 100 pounds.

13. The bushing of claim 9, wherein the bushing is disposed between a case and a vane of a gas turbine engine.

14. The bushing of claim 9, wherein the bushing has a life expectancy of more than about 200,000 cycles in a test fixture with an overhung load of about 35 pounds for about 90,000 cycles, the overhung load being increased by about 10 pounds for each additional 20,000 cycle increment until the overhung load is about 100 pounds.

15. A bushing for use in a variable inlet guide vane for a gas turbine engine, the bushing comprising:
   a composite material comprising carbon fiber reinforcing rods and a polyimide resin matrix, wherein the composite material has a thickness in the range of about 0.045 inches to about 0.055 inches, wherein the bushing is configured and disposed to substantially seal a leak path between a case and a vane of a gas turbine engine.

16. The bushing of claim 15, wherein the bushing has a life expectancy of more than about 200,000 cycles in a test fixture with an overhung load of 100 pounds.

17. The bushing of claim 15, wherein the bushing has a life expectancy of more than about 200,000 cycles in a test fixture with an overhung load of about 35 pounds for about 90,000 cycles, the overhung load being increased by about 10 pounds for each additional 20,000 cycle increment until the overhung load is about 100 pounds.

18. The bushing of claim 15, wherein the bushing life expectancy is over two times the life expectancy of a bushing comprising fiber reinforcing rods and a polyimide resin matrix having a thickness of about 0.025 inches.

19. The bushing of claim 15, wherein the bushing life expectancy is at least four times the life expectancy of a bushing comprising fiber reinforcing rods and a polyimide resin matrix having a thickness of about 0.025 inches.

20. The bushing of claim 15, wherein the bushing has a thickness of about 0.050 inches.

* * * * *